(12) United States Patent
Singh et al.

(10) Patent No.: US 10,652,861 B2
(45) Date of Patent: May 12, 2020

(54) UPLINK GRANT-FREE TRANSMISSION ENHANCEMENT FOR LATENCY AND RELIABILITY

(71) Applicant: NOKIA TECHNOLOGIES OY, Espoo (FI)

(72) Inventors: Bikramjit Singh, Espoo (FI); Zexian Li, Espoo (FI); Klaus Hugl, Vienna (AT); Sigen Ye, Whitehouse Station, NJ (US); Mikko A. Uusitalo, Helsinki (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 16/027,016

(22) Filed: Jul. 3, 2018

(65) Prior Publication Data
US 2020/0015199 A1    Jan. 9, 2020

(51) Int. Cl.
*H04W 72/04* (2009.01)
*H04L 1/18* (2006.01)
*H04W 72/12* (2009.01)

(52) U.S. Cl.
CPC ......... *H04W 72/04* (2013.01); *H04L 1/1848* (2013.01); *H04W 72/1268* (2013.01)

(58) Field of Classification Search
CPC .. H04W 72/04; H04W 72/1268; H04L 1/1848
See application file for complete search history.

(56) References Cited

U.S. PATENT DOCUMENTS 6,771,659 B1 * 8/2004 Parantainen .......... H04L 1/1685
370/466
2003/0235196 A1 * 12/2003 Balachandran ......... H04L 47/10
370/392

(Continued)

OTHER PUBLICATIONS

3GPP TR 38.913, V14.3.0 (Jun. 2017), 3rd Generation Partnership Project; Technical Specification Group Radio Acces Network; Study on Scenarios and Requirements for Next Generation Access Technologies; (Release 14), 39 pages.

(Continued)

*Primary Examiner* — Mohammad S Anwar
(74) *Attorney, Agent, or Firm* — Squire Patton Boggs (US) LLP

(57) ABSTRACT

A method may include transmitting, by a user equipment, a data packet to a network entity. The method may further include starting, by the user equipment, a timer with a first value associated with the transmission to the network entity. The method may further include checking, by the user equipment, for feedback from the network entity associated with the transmission to the network entity. The method may further include determining, by the user equipment, that no feedback for the transmission has been received within the associated timer, or a negative acknowledgement has been received without the corresponding resource allocation for re-transmission. The method may further include in response to receiving no feedback associated with the transmission within the associated timer, or receiving a negative acknowledgement without the corresponding resource allocation for re-transmission, re-transmitting, by the user equipment, the data packet to the network entity.

16 Claims, 4 Drawing Sheets

(56) References Cited

U.S. PATENT DOCUMENTS

| | | | | |
|---|---|---|---|---|
| 2012/0089892 A1* | 4/2012 | Kang | ...................... | H04L 1/188 |
| | | | | 714/799 |
| 2014/0179315 A1* | 6/2014 | Kweon | ................... | H04W 8/26 |
| | | | | 455/435.1 |
| 2015/0256316 A1* | 9/2015 | Seo | ...................... | H04L 1/1861 |
| | | | | 370/329 |

OTHER PUBLICATIONS

ETSI MCC, "Report of 3GPP TSG RAN2#100 meeting, Reno, Navada, USA", 3GPP TSG-RAN WG2 meeting #101, Athens, Greece, Feb. 26-Mar. 2, 2018, R2-1801701, 212 pages.
Ericsson, "On supporting reliable HARQ feedback for UL transmission without grant", 3GPP TSG RAN WG1 Meeting 92, Athens, Greece, Feb. 26-Mar. 2, 2018, R1-1801574, 1 page.
Huawei et al., "Reliability enhancement for grant-free transmission", 3GPP TSG RAN WG1 Meeting #92, Athens, Greece, Feb. 26-Mar. 2, 2018, R1-1801787, 6 pages.
Interdigital Inc., "On explicit HARQ feedback in DL for URLLC", 3GPP TSG RAN WG1 Meeting #92, Athens, Greece, Feb. 26-Mar. 2, 2018, R1-1802628, 2 pages.

* cited by examiner

UPLINK GRANT-FREE TRANSMISSION ENHANCEMENT FOR LATENCY AND RELIABILITY

BACKGROUND

Field

Various communication systems may benefit from improved signaling with a network entity when using transmission acknowledgements. For example, certain communication systems may benefit from improved signaling by improving the latency and reliability of grant-free uplink transmissions through the use of one or multiple timers and the corresponding behaviors at the user equipment.

Description of the Related Art

Grant-free uplink transmissions (GFUTs) refer to uplink transmissions using configured resources instead of the dynamically scheduled resources, such as a configured grant uplink transmission in 3GPP NR system. GFUT may offer low latency channel access, which may be useful for low latency services. However, GFUTs over a contention-based channel may be unreliable due to random collisions. Some use cases for GFUT require both low latency and high reliability. For GFUTs, utilization of downlink (DL) feedback may trigger user equipment to re-transmit GFUTs sooner in case of failure of the initial transmission, which may assist to achieve the requirement for low latency and high-reliability. In some radio access networks (RAN), no acknowledgement (ACK) feedback from the network entity is transmitted in the event of a successful GFUT. If no feedback is received by the user equipment within a certain period of time, the user equipment may assume that the GFUT was received successfully and assume ACK.

In the event of an erroneous GFUT, the network entity would return feedback in the form of a negative acknowledgement (NACK) or a resource grant (RG), which may be a regular UL grant, to the user equipment. In such a case, if the user equipment receives feedback before a timer expires, the user equipment may take appropriate action, such as re-transmitting the GFUT on the one or more granted resources. However, in some scenarios, relying on only a RG/NACK may be insufficient to guarantee the required latency and reliability, in particular, for GFUT. Specifically, the network entity may not have any prior knowledge of the packet transmission from the UEs configured with UL GF transmissions, and could fail to detect that the UE has been transmitting. As a result, if no RG/NACK is transmitted where the network entity fails to detect that the UE has been transmitting, the UE may falsely assume correct packet reception by the network, resulting in larger latency resulting from higher-layer re-transmission and a reduction of reliability. Thus, a need exists to provide ACK feedback for successful GFUT transmissions, as well as techniques where no feedback (neither ACK nor RG/NACK) is received for its GFUT.

SUMMARY

In accordance with an embodiment, a method may include transmitting, by a user equipment, a data packet to a network entity. The method may further include starting, by the user equipment, a timer with a first value associated with the transmission to the network entity. The method may further include checking, by the user equipment, for feedback from the network entity associated with the transmission to the network entity. The method may further include determining, by the user equipment, that no feedback for the transmission has been received within the associated timer, or a negative acknowledgement has been received without the corresponding resource allocation for re-transmission. The method may further include in response to receiving no feedback associated with the transmission within the associated timer, or receiving a negative acknowledgement without the corresponding resource allocation for re-transmission, re-transmitting, by the user equipment, the data packet to the network entity.

In accordance with an embodiment, an apparatus may include at least one processor and at least one memory including computer program code. The at least one memory and the computer program code can be configured to, with the at least one processor, cause the apparatus to at least transmit a data packet to a network entity. The at least one memory and the computer program code can be configured to, with the at least one processor, cause the apparatus to at least start a timer with a first value associated with the transmission to the network entity. The at least one memory and the computer program code can be configured to, with the at least one processor, cause the apparatus to check for feedback from the network entity associated with the transmission to the network entity. The at least one memory and the computer program code can be configured to, with the at least one processor, cause the apparatus to determine that no feedback of a transmission has been received within the associated timer, or a negative acknowledgement has been received without the corresponding resource allocation for re-transmission. The at least one memory and the computer program code can be configured to, with the at least one processor, cause the apparatus to in response to receiving no feedback associated with the transmission within the associated timer, or receiving a negative acknowledgement without the corresponding resource allocation for re-transmission, re-transmit the data packet to the network entity.

In accordance with an embodiment, an apparatus may include means for transmitting a data packet to a network entity. The apparatus may further include means for starting a timer with a first value associated with the transmission to the network entity. The apparatus may further include means for checking for feedback from the network entity associated with the transmission to the network entity. The apparatus may further include means for determining that no feedback of a transmission has been received within the associated timer, or a negative acknowledgement has been received without the corresponding resource allocation for re-transmission. The apparatus may further include means for in response to receiving no feedback associated with the transmission within the associated timer, or receiving a negative acknowledgement without the corresponding resource allocation for re-transmission, re-transmitting the data packet to the network entity.

In accordance with an embodiment, a non-transitory computer readable medium can, in certain embodiments, be encoded with instructions that may, when executed in hardware, perform a process. The process may include a method that may transmit a data packet to a network entity. The process may include a method that may start a timer with a first value associated with the transmission to the network entity. The process may include a method that may check for feedback from the network entity associated with the transmission to the network entity. The process may include a method that may determine that no feedback for the transmission has been received within the associated timer, or a negative acknowledgement has been received without the corresponding resource allocation for re-transmission. The process may include a method that may in response to receiving no feedback associated with the transmission within the associated timer, or receiving a negative acknowledgement without the corresponding resource allocation for re-transmission, re-transmit the data packet to the network entity.

In accordance with an embodiment, a computer program product may, according to certain embodiments, have instructions encoded for performing a process. The process may include a method that may transmit a data packet to a network entity. The process may include a method that may further start a timer with a first value associated with the transmission to the network entity. The process may include a method that may further check for feedback from the network entity associated with the transmission to the network entity. The process may include a method that may further determine that no feedback for the transmission has been received within the associated timer, or a negative acknowledgement has been received without the corresponding resource allocation for re-transmission. The process may include a method that may further in response to receiving no feedback associated with the transmission within the associated timer, or receiving a negative acknowledgement without the corresponding resource allocation for re-transmission, re-transmit the data packet to the network entity.

In accordance with an embodiment, an apparatus may include circuitry configured to transmit a data packet to a network entity. The apparatus may further include circuitry configured to start a timer with a first value associated with the transmission to the network entity. The apparatus may further include circuitry configured to check for feedback from the network entity associated with the transmission to the network entity. The apparatus may further include circuitry configured to determine that no feedback for the transmission has been received within the associated timer, or a negative acknowledgement has been received without the corresponding resource allocation for re-transmission. The apparatus may further include circuitry configured to in response to receiving no feedback associated with the transmission within the associated timer, or receiving a negative acknowledgement without the corresponding resource allocation for re-transmission, re-transmit the data packet to the network entity.

BRIEF DESCRIPTION OF THE DRAWINGS

For proper understanding of the invention, reference should be made to the accompanying drawings, wherein.

DETAILED DESCRIPTION

Certain embodiments discussed herein provide a procedure for user equipment when no feedback is received in response to an initial grant-free uplink transmission. Certain embodiments are, therefore, directed to improvements in computer-related technology, specifically, by conserving network resources and reducing power consumption of the UE and/or a network entity located within the network.

Figure 1:
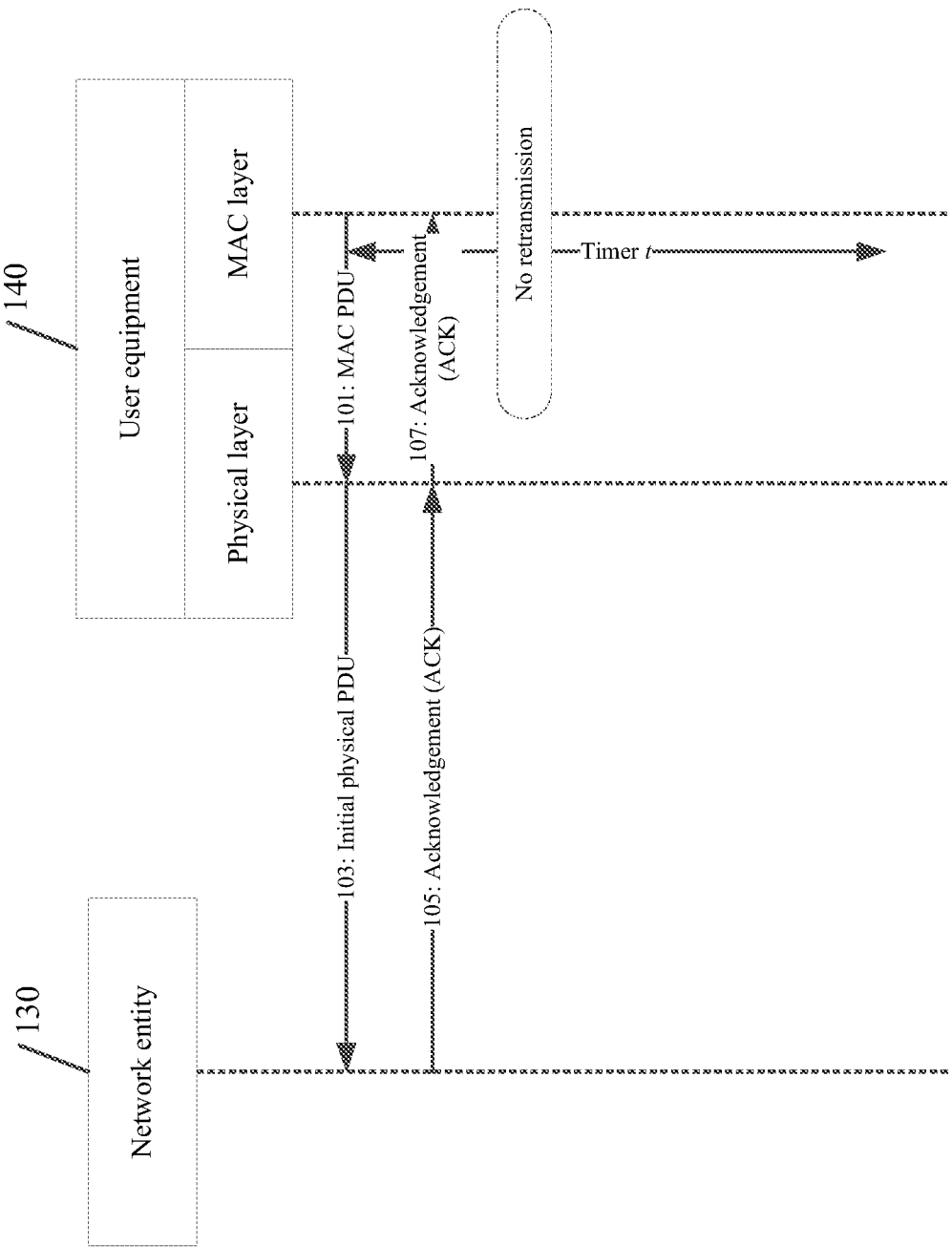
FIG. 1 illustrates an example of a signal flow diagram according to certain embodiments.
Figure 4:
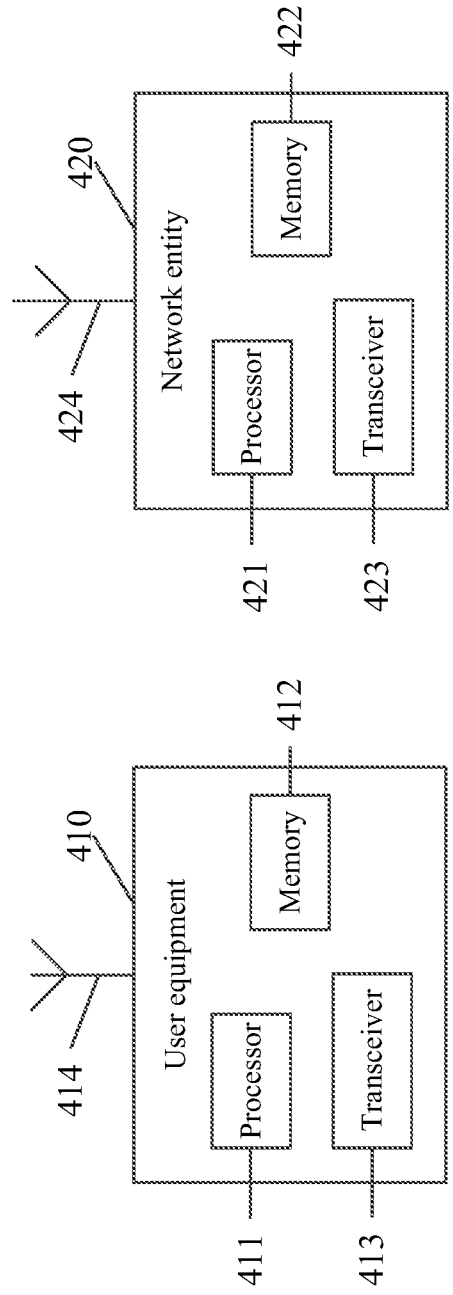
FIG. 4 illustrates a system according to certain embodiments.

FIG. 1 illustrates an example of a signal flow diagram of signaling between network entity (NE) 130, such as network entity 420, as illustrated in FIG. 4, and user equipment 140, such as user equipment (UE) 410, also as illustrated in FIG. 4. UE 140 may include a physical layer and/or a medium access control (MAC) layer. Beginning at 101, the MAC layer may send a MAC protocol data unit (PDU) to the physical layer. In response, at 103, the physical layer may send an initial physical PDU to NE 130 associated with grant-free resources. At 103, user equipment 140 may also start a timer, with a time limit of t. Upon correctly receiving the initial grant-free physical PDU, at 105, NE 130 may transmit a positive acknowledgement (ACK) message back to the physical layer of UE 140. If the ACK message is received by UE 140 before the timer for t has expired, UE 140 may determine that a positive acknowledgement of the initial transmission has been received and will not re-transmit the initial grant-free physical PDU. UE 140 may remove at least one acknowledged packet from a data buffer of UE 140, and/or terminate timer t.

Figure 2:
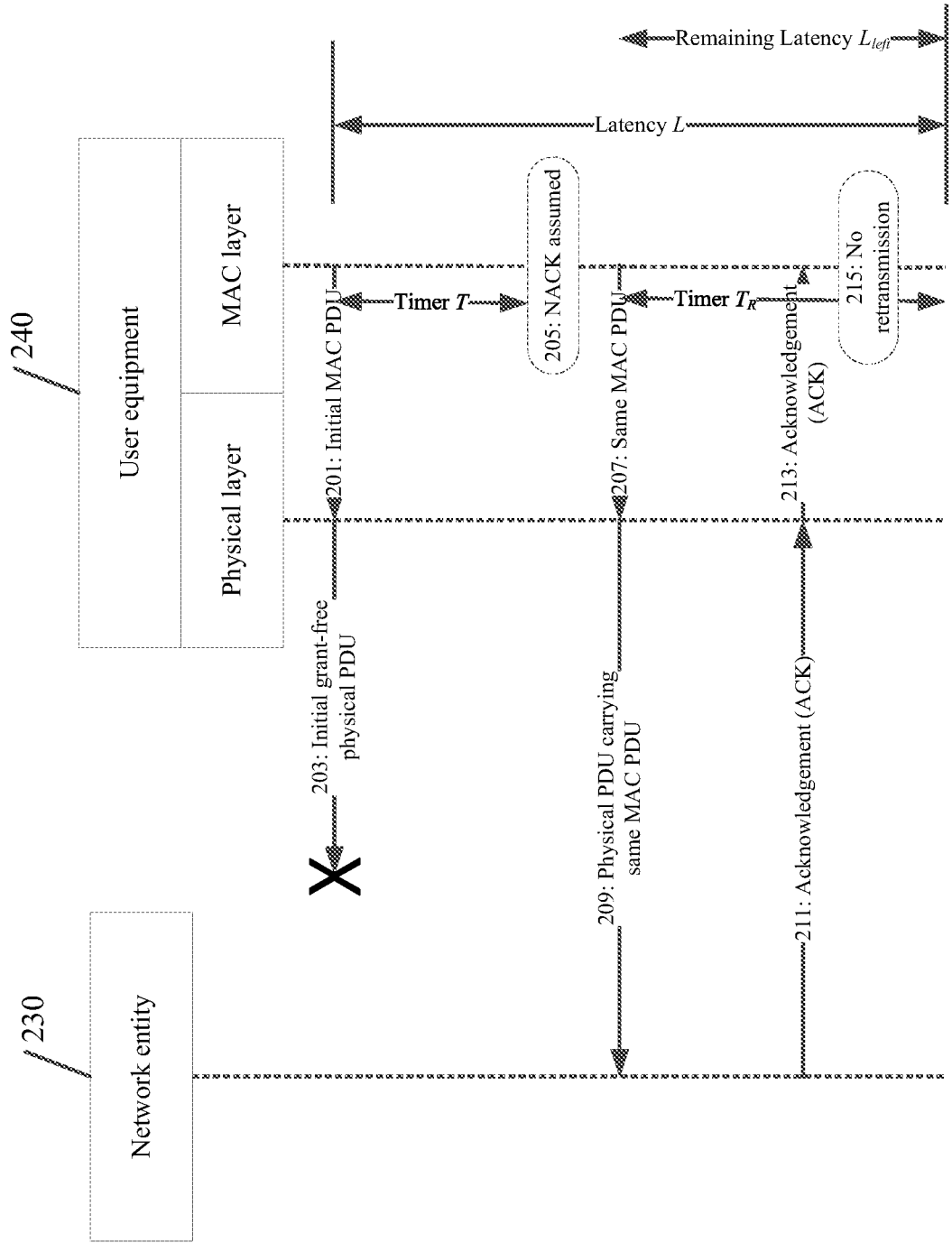
FIG. 2 illustrates an example of another signal flow diagram according to certain embodiments.

FIG. 2 illustrates an example of a signal flow diagram of signaling between network entity (NE) 230, such as network entity 420, and user equipment 240, such as user equipment (UE) 410, both of which are illustrated in FIG. 4. UE 240 may include a physical layer and/or a medium access control (MAC) layer. Beginning at 201, the MAC layer may send an initial MAC protocol data unit (PDU) to the physical layer. In response, at 203, the physical layer may attempt sending an initial grant-free physical PDU to NE 230. At 203, user equipment 240 may also start a first timer, with a time value of t. The time value t may be a predetermined or configured value, or may be determined based on a latency time/budget. In some embodiments, the first timer is initiated at the start or the completion of the initial transmission. In some embodiments, the latency time may begin at the start or the completion of the initial transmission. As NE 230 could not identify that the UE has been transmitting the grant-free physical PDU (indicated by the broken path of step 203), the NE will not send any feedback (in contrast to the correct reception in FIG. 1, step 105). At 205, after expiration of timer t without receiving feedback from NE 230, UE 240 may assume no acknowledgement of the initial grant-free physical PDU transmitted in step 203.

In step 207, the MAC layer of UE 240 may transmit the same MAC PDU to the physical layer of UE 240. When the user equipment uses a grant-free option, in case no feedback (ACK or NACK or UL grant) is received from the network node, the user equipment may transmit the same data packet using the uplink grant-free resources. Alternatively or additionally, in some embodiments, when the scheduling request resource is available, the user equipment may transmit the scheduling request to initiate uplink grant-based transmissions. Alternatively or additionally, in some embodiments, the user equipment may use resources allocated for other services to perform packet re-transmission. Alternatively or additionally, in some embodiments, the user equipment may treat the re-transmission as a new data packet, and/or follow existing procedure for uplink transmissions.

At the same time of step 207, UE 240 may begin a second timer. In some embodiments, a value of the second timer may be predetermined or configured, which may be the same or different from the value of the first timer. In some embodiments, a value of the second timer may be determined based on the remaining latency time, where the period of remaining latency time may be equal to the latency time associated with the total time budget minus the first timer. In some embodiments, a value of the second timer may be set to equal a value of the first timer when the value of the second timer is less than or equal to the remaining latency budget, which is the overall latency budget for all transmissions minus the value of the first timer. In some embodiments, a value of the second timer may be set to less than a value of the first timer when the remaining latency budget is less than the value of the first timer. In some embodiments, the second timer may not be created when the period of remaining latency is less than or equal to a predetermined or configured threshold value, in which case UE 240 will not re-transmit the same data packet further in the future. In some embodiments, the MAC layer of UE 240 may instruct the physical layer of UE 240 to transmit the MAC PDU multiple times (or with multiple repetitions) without waiting for feedback when the remaining latency budget is less than or equal to a predetermined or configured threshold value. In step 209, the physical layer of UE 240 may transmit a new grant-free physical PDU to NE 230. In some embodiments, the new grant-free physical PDU transmitted in step 209 may carry the same transport block (TB) or at least partially the same payload as the grant-free physical PDU transmitted in step 203. In step 211, NE 230 may transmit an ACK message to the physical layer of UE 240 after successful reception of the transmitted physical PDU of step 209, and in step 213, the physical layer may deliver the ACK to the MAC layer of UE 240. In case UE 240 does not receive any acknowledgment before the second timer expires, UE 240 may initiate a third transmission, and start a third timer. This procedure can repeat until the remaining latency budget becomes too small, e.g. smaller than a threshold, and/or until a predetermined or configured maximum number of re-transmissions is reached.

Figure 3:
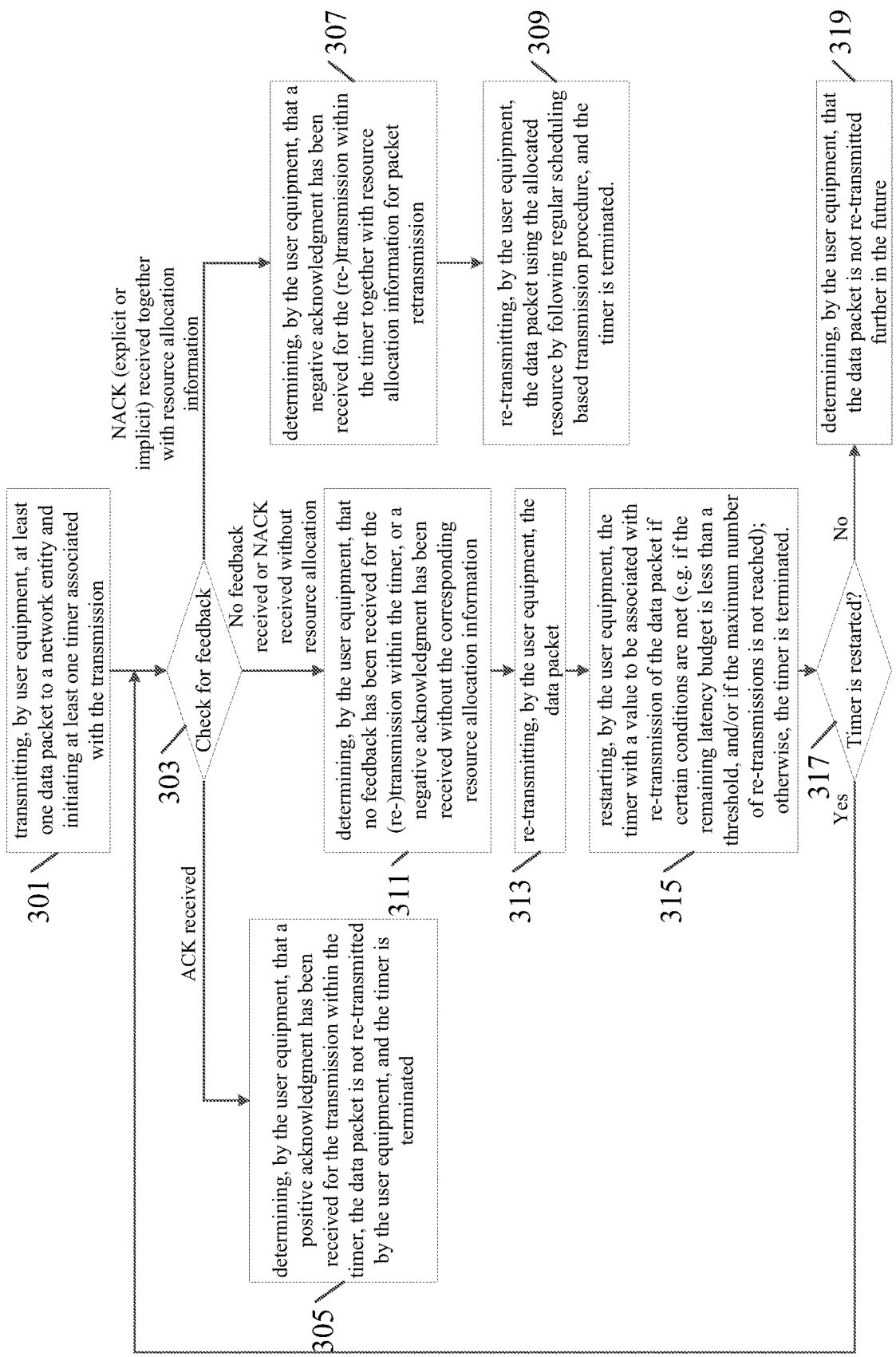
FIG. 3 illustrates an example of a method according to certain embodiments.

FIG. 3 illustrates an example of a method according to certain embodiments. In step 301, a user equipment, such as user equipment (UE) 410 illustrated in FIG. 4, may transmit a data packet to a network entity, such as network entity (NE) 420 illustrated in FIG. 4, and initiate a timer associated with the transmission. The transmission may be a grant-free physical protocol data unit. Furthermore, in some embodiments, the timer may be initiated at the start or the completion of the transmission and/or the latency time may begin at the start or the completion of the transmission. The timer value may be a predetermined or configured value, or may be determined based on the latency time.

In step 303, the UE continuously checks if any feedback messages for the transmission have been transmitted from the NE. If the UE receives an acknowledgment message from the NE based on successful reception of the transmission, in step 305, the user equipment may determine that a positive acknowledgment has been received for the transmission within the timer. The UE may determine that the data packet is not to be re-transmitted and terminate the timer. Alternatively or additionally, the packet associated with the acknowledgement is removed from a data buffer of the user equipment. In some embodiments, at least one HARQ-buffer associated with the grant-free transmission is not terminated/flushed, and/or may be terminated/overwritten upon receipt of additional data in an associated HARQ process.

If the UE receives at least one negative acknowledgement from the NW entity based on unsuccessful reception of the data packet transmission, whether explicitly or implicitly, with resource allocation information such as through a resource grant (RG), at step 307, the user equipment may determine that a negative acknowledgement has been received for the transmission within the timer together with resource allocation information for packet re-transmission. In step 309, the user equipment may re-transmit the data packet using the allocated resource by following a regular procedure for scheduling based transmission, and the timer may be terminated.

In step 311, if no feedback from the NE is received by the user equipment following the transmission or a negative acknowledgement has been received without a corresponding resource allocation for re-transmission, the user equipment may determine that no feedback has been received for the transmission within the timer or a negative acknowledgement has been received without a corresponding resource allocation within the timer.

In step 313, the user equipment may re-transmit the data packet. When the user equipment uses a grant-free option, the user equipment may transmit the same data packet using the uplink grant-free resources. Alternatively or additionally, in some embodiments, when the scheduling request resource is available, the user equipment may transmit the scheduling request to initiate uplink grant-based transmissions. Alternatively or additionally, in some embodiments, the user equipment may use resources allocated for other services to perform packet re-transmission. Alternatively or additionally, in some embodiments, the user equipment may treat the re-transmission as a new data packet, and/or follow existing procedure for uplink transmissions.

In step 315, the user equipment may restart the timer associated with the re-transmission with a new value if certain conditions are met. The conditions can include for example that the remaining latency budget is larger than a predetermined or configured threshold, and/or the predetermined or configured maximum number of re-transmissions is not reached. Otherwise, the timer is terminated. In some embodiments, the new value of the timer may be predetermined or configured. The new value of the timer may be the same or different from the previous value(s) of the timer. In some embodiments, the new value of the timer may be determined based on the remaining latency time, where the period of remaining latency time may be equal to the latency time associated with previous transmission minus the previous value of the timer. In some embodiments, the new value of the timer may be set to equal a previous value of the timer when the new value of the timer is less than or equal to the remaining latency time. In some embodiments, the new value of the timer may be set to less than a previous value of the timer when the remaining latency budget is less than the previous value of the timer. In case the value of the timer is determined by the UE, the UE may signal the value to the NE.

If the timer is not restarted in step 317, the UE may determine that the data packet is not re-transmitted further in the future, as in step 319. Alternatively or additionally, the packet associated with the acknowledgement is removed from a data buffer of the user equipment. In some embodiments, at least one HARQ-buffer associated with the grant-free transmission is not terminated/flushed, and/or may be terminated/overwritten upon receipt of additional data in an associated HARQ process. If the timer is restarted in step 317, the UE goes back to step 303 to check for feedback for the re-transmission. If no feedback is received within the timer associated with the re-transmission, or a negative acknowledgement is received without resource allocation, the UE repeats the steps starting from 309. This procedure may repeat until the timer is terminated in step 305, 309, or 319.

FIG. 4 illustrates a system according to certain embodiments. It should be understood that each signal or block in FIGS. 1-3 may be implemented by various means or their combinations, such as hardware, software, firmware, one or more processors and/or circuitry. In one embodiment, a system may include several devices, such as, for example, user equipment 410 and/or network entity 420. The system may include more than one user equipment 410 and more than one network entity 420.

User equipment 414 may be a mobile station (MS) such as a mobile phone or smart phone or multimedia device, an IoT cellular device, a computer, such as a tablet, provided with wireless communication capabilities, personal data or digital assistant (PDA) provided with wireless communication capabilities, portable media player, digital camera, pocket video camera, navigation unit provided with wireless communication capabilities or any combinations thereof.

Network entity 420 may be a CBSD, a base station, an access point, an access node, an eNB, a gNB, a server, a host, a MME, a S-GW, a P-GW, a PCRF, a P-CSCF, E/CSCF, or any other network entity that may communicate with user equipment 410.

Each of these devices may include at least one processor or control unit or module, respectively indicated as 411 and 421. At least one memory may be provided in each device, and indicated as 412 and 422, respectively. The memory may include computer program instructions or computer code contained therein. One or more transceivers 413 and 423 may be provided, and each device may also include an antenna, respectively illustrated as 414 and 424. Although only one antenna each is shown, many antennas and multiple antenna elements may be provided to each of the devices. Other configurations of these devices, for example, may be provided. For example, user equipment 410 and/or network entity 420 may be additionally configured for wired communication, in addition to wireless communication, and in such a case, antennas 414 and 424 may illustrate any form of communication hardware, without being limited to merely an antenna.

Transceivers 413 and 423 may each, independently, be a transmitter, a receiver, or both a transmitter and a receiver, or a unit or device that may be configured both for transmission and reception. The transmitter and/or receiver (as far as radio parts are concerned) may also be implemented as a remote radio head which is not located in the device itself, but in a mast, for example. The operations and functionalities may be performed in different entities, such as nodes, hosts or servers, in a flexible manner. In other words, division of labor may vary case by case. One possible use is to make a network node deliver local content. One or more functionalities may also be implemented as virtual application(s) in software that can run on a server.

In some embodiments, an apparatus, such as a user equipment or a network node, may include means for carrying out embodiments described above in relation to FIGS. 1-3. In certain embodiments, at least one memory including computer program code can be configured to, with the at least one processor, cause the apparatus at least to perform any of the processes described herein.

Processors 411 and 421 may be embodied by any computational or data processing device, such as a central processing unit (CPU), digital signal processor (DSP), application specific integrated circuit (ASIC), programmable logic devices (PLDs), field programmable gate arrays (FPGAs), digitally enhanced circuits, or comparable device or a combination thereof. The processors may be implemented as a single controller, or a plurality of controllers or processors.

For firmware or software, the implementation may include modules or unit of at least one chip set (for example, procedures, functions, and so on). Memories 412 and 422 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate therefrom. Furthermore, the computer program instructions may be stored in the memory and which may be processed by the processors can be any suitable form of computer program code, for example, a compiled or interpreted computer program written in any suitable programming language. The memory or data storage entity is typically internal but may also be external or a combination thereof, such as in the case when additional memory capacity is obtained from a service provider. The memory may be fixed or removable.

The memory and the computer program instructions may be configured, with the processor for the particular device, to cause a hardware apparatus such as user equipment 410 and/or network entity 420, to perform any of the processes described above (see, for example, FIGS. 1-3). Therefore, in certain embodiments, a non-transitory computer-readable medium may be encoded with computer instructions or one or more computer program (such as added or updated software routine, applet or macro) that, when executed in hardware, may perform a process such as one of the processes described herein. Computer programs may be coded by a programming language, which may be a high-level programming language, such as objective-C, C, C++, C #, Java, etc., or a low-level programming language, such as a machine language, or assembler. Alternatively, certain embodiments may be performed entirely in hardware.

Furthermore, although FIG. 4 illustrates a system including a user equipment 410 and/or network entity 420, certain embodiments may be applicable to other configurations, and configurations involving additional elements, as illustrated and discussed herein. For example, multiple user equipment devices and multiple base stations may be present, or other nodes providing similar functionality, such as nodes that combine the functionality of a user equipment and a base station, such as a relay node. User equipment 410 may likewise be provided with a variety of configurations for communication other than communicating with network entity 420. For example, user equipment 410 may be configured for device-to-device, machine-to-machine, or vehicle-to-vehicle communication.

As shown in FIG. 4, transceivers 413 and 423 may be provided, and one or more devices may also include at least one antenna, respectively illustrated as 414 and 424. The device may have many antennas, such as an array of antennas configured for multiple input multiple output (MIMO) communications, or multiple antennas for multiple radio access technologies. Other configurations of these devices, for example, may be provided.

Transceivers 413 and 423 may be a transmitter, a receiver, or both a transmitter and a receiver, or a unit or device that may be configured both for transmission and reception.

Processors 411 and 421 may be embodied by any computational or data processing device, such as a central processing unit (CPU), application specific integrated circuit (ASIC), or comparable device. The processors may be implemented as a single controller, or a plurality of controllers or processors.

Memories 412 and 422 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate from the one or more processors. Furthermore, the computer program instructions stored in the memory and which may be processed by the processors may be any suitable form of computer program code, for example, a compiled or interpreted computer program written in any suitable programming language. Memory may be removable or non-removable.

The memory and the computer program instructions may be configured, with the processor for the particular device, to cause a hardware apparatus such as user equipment to perform any of the processes described below (see, for example, FIGS. 1-3). Therefore, in certain embodiments, a non-transitory computer-readable medium may be encoded with computer instructions that, when executed in hardware, perform a process such as one of the processes described herein. Alternatively, certain embodiments may be performed entirely in hardware.

In certain embodiments, an apparatus may include circuitry configured to perform any of the processes or functions illustrated in FIGS. 1-3. For example, circuitry may be hardware-only circuit implementations, such as analog and/or digital circuitry. In another example, circuitry may be a combination of hardware circuits and software, such as a combination of analog and/or digital hardware circuit(s) with software or firmware, and/or any portions of hardware processor(s) with software (including digital signal processor(s)), software, and at least one memory that work together to cause an apparatus to perform various processes or functions. In yet another example, circuitry may be hardware circuit(s) and or processor(s), such as a microprocessor(s) or a portion of a microprocessor(s), that include software, such as firmware for operation. Software in circuitry may not be present when it is not needed for the operation of the hardware.

The features, structures, or characteristics of certain embodiments described throughout this specification may be combined in any suitable manner in one or more embodiments. For example, the usage of the phrases "certain embodiments," "some embodiments," "other embodiments," or other similar language, throughout this specification refers to the fact that a particular feature, structure, or characteristic described in connection with the embodiment may be included in at least one embodiment of the present invention. Thus, appearance of the phrases "in certain embodiments," "in some embodiments," "in other embodiments," or other similar language, throughout this specification does not necessarily refer to the same group of embodiments, and the described features, structures, or characteristics may be combined in any suitable manner in one or more embodiments.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. The above embodiments may be applied to any communication network or wireless system. While many of the above embodiments refer to LTE or LTE-A, other embodiments may be used for 3GPP fifth generation (5G) technology, fourth generation (4G) technology, New Radio (NR) technology, and/or any wireless land access network (WLAN) technology.

PARTIAL GLOSSARY

3GPP Third Generation Partnership Project
5G Fifth Generation
ACK Positive Acknowledgement
DCI Downlink Control Information
eNB Evolved NodeB
FI Format Indicator
GF Grant-free
GFUT Grant-free Uplink Transmission
HARQ Hybrid Automatic Repeat Request
ID Identity
LTE Long Term Evolution
LTE-A LTE Advanced
MME Mobility Management Entity
NACK Negative Acknowledgement
NR New Radio
SR Scheduling Request
TB Transport Block
UE User Equipment
UL Uplink
URLLC Ultra-Reliable and Low Latency Communication

We claim:

1. A method, comprising:
transmitting, by a user equipment, a data packet to a network entity;
starting, by the user equipment, a timer with a first value associated with the transmission to the network entity;
checking, by the user equipment, for feedback from the network entity associated with the transmission to the network entity;
determining, by the user equipment, that no feedback transmission has been received within the associated timer, or a negative acknowledgement has been received without the corresponding resource allocation for re-transmission;
in response to receiving no feedback associated with the transmission within the associated timer, or receiving a negative acknowledgement without the corresponding resource allocation for re-transmission, re-transmitting, by the user equipment, the data packet to the network entity;
restarting, by the user equipment, the timer with a second value upon re-transmission of the data packet when certain conditions are met, wherein the said conditions include at least one of:
the remaining latency budget is less than a threshold; and
the maximum number of re-transmissions is not reached; and
upon the restarting of the timer, repeating the steps of checking, determining, and re-transmitting.

2. The method according to claim 1, wherein the transmission uses resources configured by the network entity.

3. The method according to claim 1, wherein the data packet is re-transmitted on resources configured or dynamically granted by the network entity.

4. The method according to claim 1, further comprising:
terminating, by the user equipment, the timer when certain conditions are not met; and
not re-transmitting, by the user equipment, the data packet to the network entity further in the future.

5. The method according to claim 1, wherein the first value of the timer is predetermined, configured, and/or determined based on the latency budget of the data packet.

6. The method according to claim 1, wherein the timer starts at the beginning of the corresponding transmission.

7. The method according to claim 1, wherein the timer starts at the completion of the corresponding transmission.

8. The method according to claim 1, wherein the second value of the timer is predetermined, configured, and/or determined based on the remaining latency budget of the data packet.

9. An apparatus, comprising:
at least one memory comprising computer program code;
at least one processor;
wherein the at least one memory and the computer program code are configured, with the at least one processor, to cause the apparatus at least to:
transmit a data packet to a network entity;
start a timer with a first value associated with the transmission to the network entity;
check for feedback from the network entity associated with the transmission to the network entity;
determine that no feedback for the transmission has been received within the associated timer, or a negative acknowledgement has been received without the corresponding resource allocation for re-transmission;
in response to receiving no feedback associated with the transmission within the associated timer, or receiving a negative acknowledgement without the corresponding resource allocation for re-transmission, re-transmit the data packet to the network entity;
restart the timer with a second value upon re-transmission of the data packet when certain conditions are met, wherein the said conditions include at least one of:
the remaining latency budget is less than a threshold; and
the maximum number of re-transmissions is not reached; and
upon the restart of the timer, repeat the steps of checking, determining, and re-transmitting.

10. The apparatus according to claim 9, wherein the transmission uses resources configured by the network entity.

11. The apparatus according to claim 9, wherein the data packet is re-transmitted on resources configured or dynamically granted by the network entity.

12. The apparatus according to claim 9, wherein the at least one memory and the computer program code are further configured, with the at least one processor, to cause the apparatus at least to:
terminate the timer when certain conditions are not met; and
not re-transmit the data packet to the network entity further in the future.

13. The apparatus according to claim 9, wherein the first value of the timer is predetermined, configured, and/or determined based on the latency budget of the data packet.

14. The apparatus according to claim 9, wherein the timer starts at the beginning of the corresponding transmission.

15. The apparatus according to claim 9, wherein the timer starts at the completion of the corresponding transmission.

16. The apparatus according to claim 9, wherein the second value of the timer is predetermined, configured, and/or determined based on the remaining latency budget of the data packet.

* * * * *